United States Patent
Pei et al.

(10) Patent No.: US 9,470,810 B2
(45) Date of Patent: Oct. 18, 2016

(54) DATA DOUBLE-SEARCHING APPARATUS, METHODS, AND SYSTEMS

(71) Applicant: Halliburton Energy Services, Inc., Houston, TX (US)

(72) Inventors: Donghong Pei, Houston, TX (US); Arthur Cheng, Houston, TX (US); Janusz Peron, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/428,172

(22) PCT Filed: Oct. 23, 2012

(86) PCT No.: PCT/US2012/061481
§ 371 (c)(1),
(2) Date: Mar. 13, 2015

(87) PCT Pub. No.: WO2014/065785
PCT Pub. Date: May 1, 2014

(65) Prior Publication Data
US 2015/0268364 A1    Sep. 24, 2015

(51) Int. Cl.
*G01V 1/28* (2006.01)
*G01V 1/40* (2006.01)
*G01V 1/30* (2006.01)

(52) U.S. Cl.
CPC ............... *G01V 1/282* (2013.01); *G01V 1/303* (2013.01); *G01V 1/306* (2013.01); *G01V 1/40* (2013.01); *G01V 2210/161* (2013.01); *G01V 2210/626* (2013.01); *G01V 2210/6222* (2013.01)

(58) Field of Classification Search
CPC .......... G01V 1/28; G01V 1/282; G01V 1/30; G01V 1/303; G01V 1/40; G01V 2210/161; G01V 2210/6222; G01V 2210/626

USPC .......... 702/6, 7, 14, 19; 367/14, 25, 37, 38; 703/2, 10

See application file for complete search history.

(56) References Cited

U.S. PATENT DOCUMENTS 5,740,124 A       4/1998   Chunduru et al.
7,859,943 B2 *   12/2010   Herwanger ......... E21B 41/0064
                                                                            367/38

(Continued)

FOREIGN PATENT DOCUMENTS

EP            1865343 A1      12/2007
EP            1834192 B1       3/2012
WO     WO-2014065785 A1        5/2014

OTHER PUBLICATIONS

"International Application Serial No. PCT/US2012/061481, International Preliminary Report on Patentability mailed Feb. 3, 2015", 5 pgs.

(Continued)

*Primary Examiner* — John H Le
(74) *Attorney, Agent, or Firm* — Schwegman, Lundberg & Woessner, P.A.; Benjamin Fite

(57) ABSTRACT

In some embodiments, an apparatus and a system, as well as a method and an article, may operate to receive seismic survey data for use with an isotropic velocity model describing a selected geological formation volume. Further activity may include exhaustively searching the seismic survey data to provide an error map, globally optimizing the error map to provide anisotropy parameters for the selected geological formation volume, and inverting the anisotropy parameters to transform the isotropic velocity model into an anisotropic velocity model for the selected geological formation volume. Additional apparatus, systems, and methods are described.

20 Claims, 7 Drawing Sheets

(56) References Cited

U.S. PATENT DOCUMENTS

| | | | |
|---|---|---|---|
| 8,792,302 B2* | 7/2014 | Bachrach | G01V 1/282 367/14 |
| 2008/0195358 A1 | 8/2008 | El Ouair et al. | |
| 2008/0290876 A1 | 11/2008 | Ameen | |
| 2008/0316860 A1 | 12/2008 | Muyzert et al. | |
| 2010/0177595 A1 | 7/2010 | Khare et al. | |
| 2012/0078600 A1 | 3/2012 | Horne et al. | |
| 2012/0127827 A1 | 5/2012 | Underhill et al. | |

OTHER PUBLICATIONS

"International Application Serial No. PCT/US2012/061481, International Search Report mailed Jan. 4, 2013", 2 pgs.

"International Application Serial No. PCT/US2012/061481, Written Opinion mailed Jan. 4, 2013", 4 pgs.

European Application Serial No. 12887185.2, Extended European Search Report mailed Sep. 29, 2015, 6 pgs.

Colaco, Marcelo J, et al., "A Survey of Basic Deterministic, Heuristic and Hybrid Methods for Single Objective Optimization and Response Surface Generation", METTI IV—Thermal Measurements and Inverse Techniques, (Nov. 8, 2009), 1-30.

Rüdiger, Weitzmann, "Theory and application of optimization strategies for the design of seismically excited structures", [Online]. Retrieved from the Internet: <URL:https://e-pub.uni-weimar.de/opus4/files/1406/Wei tzmann.pdf>, (Oct. 30, 2009), 25-26.

* cited by examiner

DATA DOUBLE-SEARCHING APPARATUS, METHODS, AND SYSTEMS

PRIORITY APPLICATIONS

This application is a U.S. National Stage Filing under 35 U.S.C. 371 from International Application PCT/US2012/061481, filed on 23 Oct. 2012, and published as WO 2014/065785 A1 on 1 May 2014; which application and publication are incorporated herein by reference in their entirety.

BACKGROUND

Understanding the structure and properties of geological formations can reduce the cost of drilling wells for oil and gas exploration. Measurements made in a borehole (i.e., down hole measurements) are typically performed to attain this understanding, to identify the composition and distribution of material that surrounds the measurement device down hole.

A walk-away vertical seismic profile (VSP) survey includes some of these measurements. This type of survey is used to determine the response of a plurality of receivers in a borehole to excitation by at least one seismic source located at a plurality of distances from the well-bore. However, the results are often affected by seismic anisotropy, which induces a directional dependence in wave propagation. For example, in an anisotropic Earth model, seismic velocity can vary with the ray path propagation angle. This is caused by the alignment of rock heterogeneities, including velocity layering, crystal fabrics, fractures, and other microstructures. Thus, the determination of anisotropic parameters from surface seismic data is often difficult, due to relatively poor data quality and the relatively low frequencies at which the measurements are made.

DETAILED DESCRIPTION

While it is possible to extract formation anisotropy information from VSP data, existing methods are limited by the inversion techniques that are used. For example, one method involves total travel time analysis, to calculate the anisotropy parameters for a buried layer by inverting the total travel times of direct arrivals traveling from a surface source to a well-bore receiver in a walk-away VSP geometry.

In this case, various inversion algorithms may be applied, including exhaustive searching, linear inversion, and global optimization. Exhaustive searching is stable and usually produces a solution that is closer to the true values than the initial (assumed) values. However, this type of search is "blind". That is, when the search space is large, performance is poor compared to other heuristic searches. As a matter of contrast, linear inversion methods can provide the answer more quickly, but the quality of the final result inherently depends on the accuracy of the initial values that are assumed.

Another possibility involves global optimization, which is robust and has the advantage of providing results that do not depend so greatly on initial value assumptions. This type of optimization can more easily accommodate strong nonlinearities and discontinuities (than exhaustive searching), and can be used to find global extremes in the undulating structure of the cost function. However, global optimization usually takes up a great deal of computer time to arrive at a solution, guided by tuning parameters that are carefully chosen.

Therefore, to address some of these challenges, among others, apparatus, systems, and methods are described herein that use a double-searching schedule to combine an exhaustive search followed by global optimization. As a type of global optimization, the principles of traditional simulated annealing have been explained by various authors, and those of ordinary skill in the art are aware that at least four alternative methods have been developed. One of these is the Very Fast Simulated Annealing (VFSA) technique, which is exponentially faster than traditional simulated annealing and, in some cases, superior to evolutionary methods or genetic algorithms. Because it yields relatively rapid convergence, VFSA has been selected herein to optimize Thomsen's anisotropic parameters for layered models.

The resulting double-searching schedule has the advantage of reducing dependence on the accuracy of initial value assumptions, and the ordered combination of these techniques can operate to find global extreme values within a reasonable amount of computation time. Various example embodiments that can provide some or all of these advantages will now be described in detail.

Figure 1:
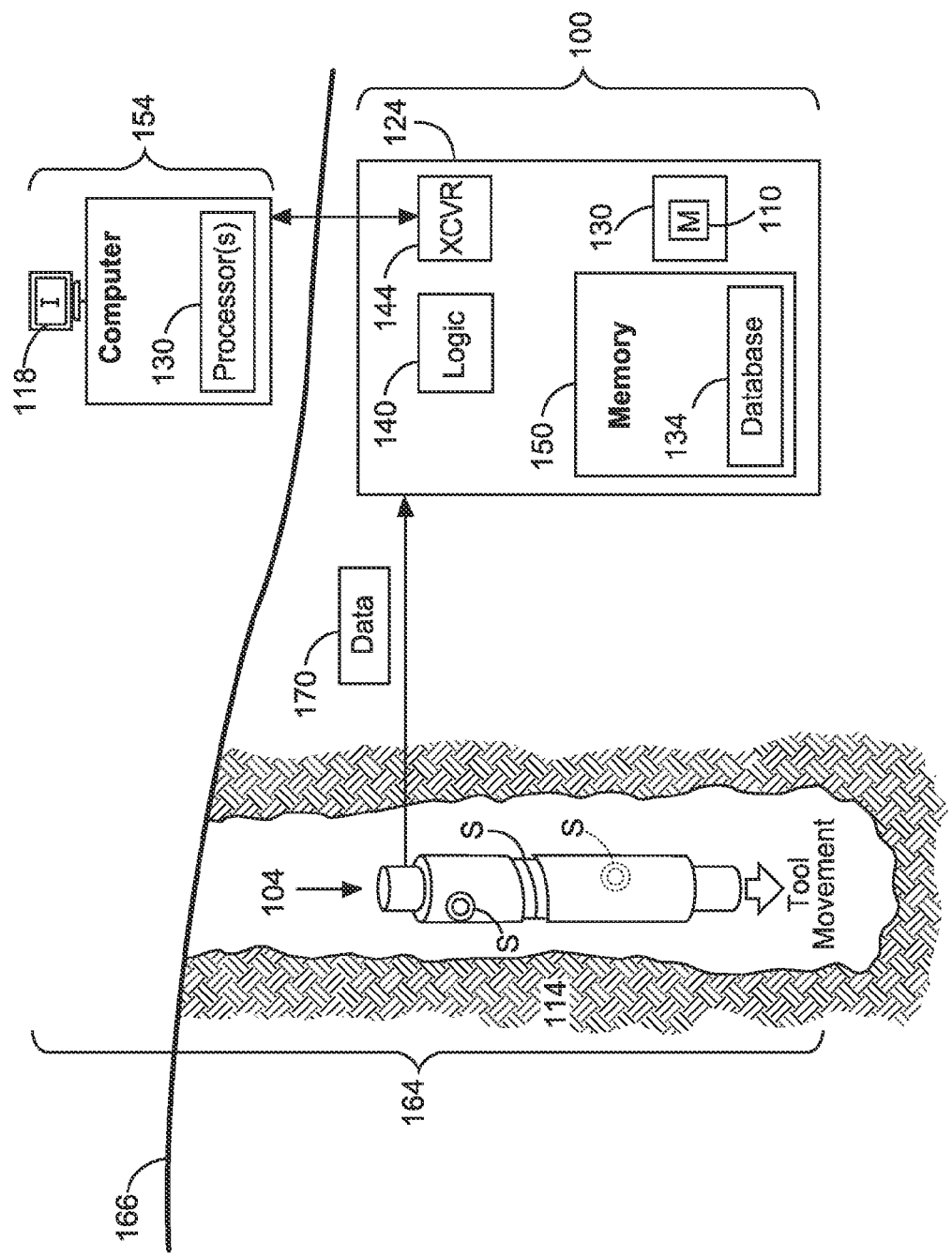
FIG. 1 is a block diagram of apparatus and systems according to various embodiments of the invention.

For example, FIG. 1 is a block diagram of apparatus 100 and systems 164 according to various embodiments of the invention. In some embodiments, the system 164 comprises one or more of the apparatus 100, which may include a housing 104. The housing 104 might take the form of a wireline tool body, or a down hole tool.

Processor(s) 130 and/or logic 140 may be located at the surface 166, as part of a surface logging facility 154, or in a data acquisition system 124 above or below the Earth's surface 166, to be packaged with the apparatus 100, including the housing 104. Logic 140 can be used to acquire and process signals received from the apparatus 100, according to the various methods described herein. Acquired data 170 and processed data 110 can be stored in the memory 150, perhaps as part of a database 134.

The system 164 may comprise a data transceiver 144 (e.g., a telemetry transmitter and/or receiver) to transmit data 170, acquired from sensors S, to the surface logging facility 154. The surface logging facility 154 may include a display to show images I of the acquired data and processed data. Thus, many embodiments may be realized.

For example, in one embodiment, a system 164 may comprise a housing 104 and one or more down hole sensors S attached to the housing 104. The down hole sensors S can be used to provide data 170, such as seismic survey data describing a selected volume of a geological formation 114.

The system 164 may comprise a processor 130 to receive and exhaustively search the seismic survey data to provide an error map. The processor 130 may operate to globally optimize the error map to provide anisotropy parameters for the selected volume of the geological formation 114, and to invert the anisotropy parameters to transform an isotropic velocity model describing the selected geological formation volume into an anisotropic velocity model M for the selected volume of the geological formation 114. These activities will now be described in further detail.

Figure 2:
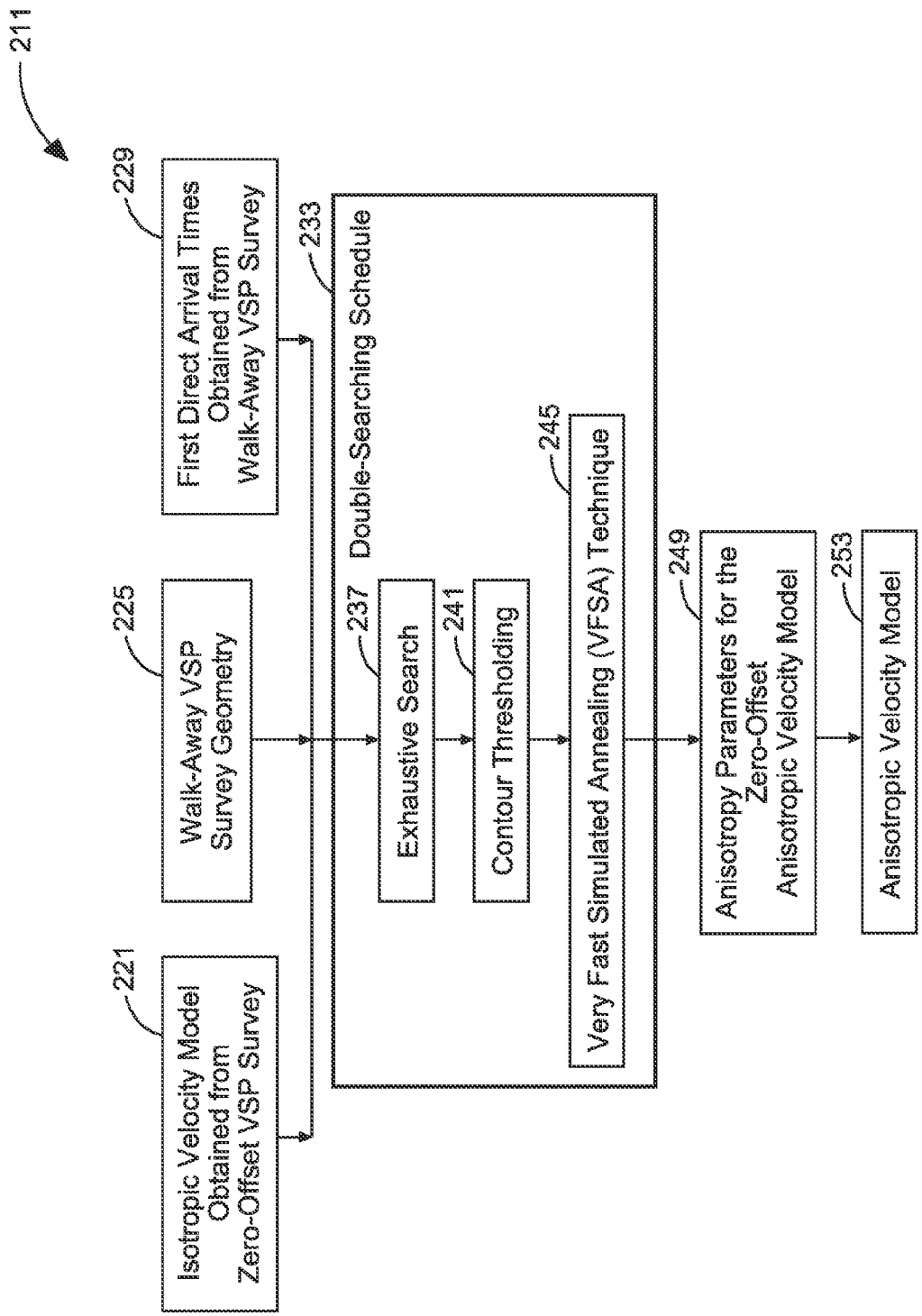
FIG. 2 is a flow chart illustrating several methods according to various embodiments of the invention.

FIG. 2 is a flow chart illustrating several methods 211 according to various embodiments of the invention. These methods 211 can be used to extract anisotropy information from acquired walk-away VSP survey data, and may be implemented by a number of configurations of the apparatus 100 and system 164 shown in FIG. 1.

In method 211, the workflow for producing an anisotropic velocity model using an exhaustive search of walk-away VSP data, followed by a global optimization method (e.g., VFSA), is illustrated. Here, the input to the double-searching schedule 233 is shown to include an isotropic velocity model 221 obtained from a zero-offset VSP survey, walk-away VSP survey geometry 225, and the first direct arrival times 229 (also known as "picks" by those of ordinary skill in the art) selected from the walk-away VSP survey data. The walk-away VSP survey geometry is composed of coordinates of seismic shots and down hole geophone receivers. As is known to those of ordinary skill in the art, these coordinates are recorded during field acquisition and can be read from the seismic recordings.

The model 221 is a two-dimensional, planar-layered velocity model is used to represent a local geology. The model is composed of a sequence of stratified layers, where the layer interface is planar. Each layer is modeled according to layer depth, layer dip, seismic P-wave velocity, seismic S-wave velocity, layer density, and the anisotropic Thomsen parameters of delta ($\delta$), epsilon ($\epsilon$), and/or gamma ($\gamma$). The output from the double-searching schedule 233 includes anisotropy measurement parameters for the zero-offset anisotropic velocity model of the geological formation layer.

As part of the double-searching schedule 233, the information obtained from blocks 221, 225, and 229 is submitted to an exhaustive search 237 with a large search increment. This search can be used to produce an error map.

For example, considering the Thomsen parameters of delta and epsilon, the anisotropic delta might span a range of about −0.3 to about 0.3, with an increment of about 0.05, and the anisotropic epsilon might span a range of about −0.5 to about 0.5, with an increment of about 0.05. The output of the exhaustive search for delta and epsilon can be presented in the form of a two-dimensional error map comprising two-dimensional grids with a root-mean-square (RMS) error supplied at each grid point.

At block 241, a contour can be drawn on the error map. The contour values that lie within a user-specified threshold are used to make up a search range for anisotropic Thomsen parameters. The search range, along with other tuning parameters, can be supplied to the VFSA technique 245 to produce the final version of the anisotropic parameters 249. These parameters 249, in turn, are used to produce the anisotropic velocity model 253.

Figure 3:
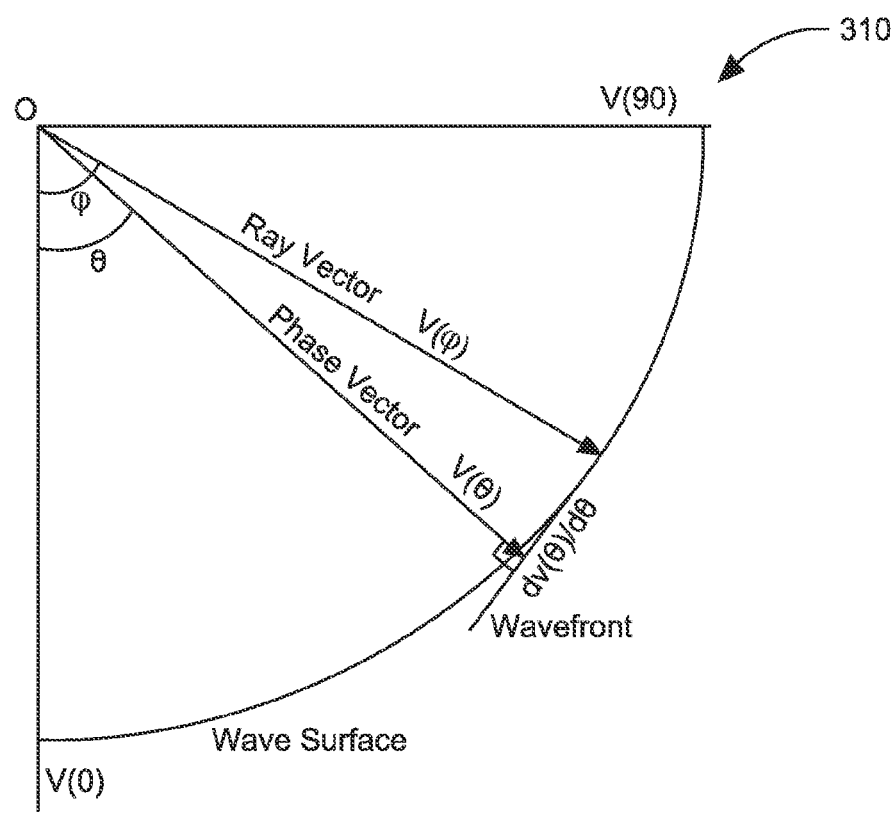
FIG. 3 illustrates the relationships between group angles and phase angles in isotropic media, according to various embodiments of the invention.
Figure 3:
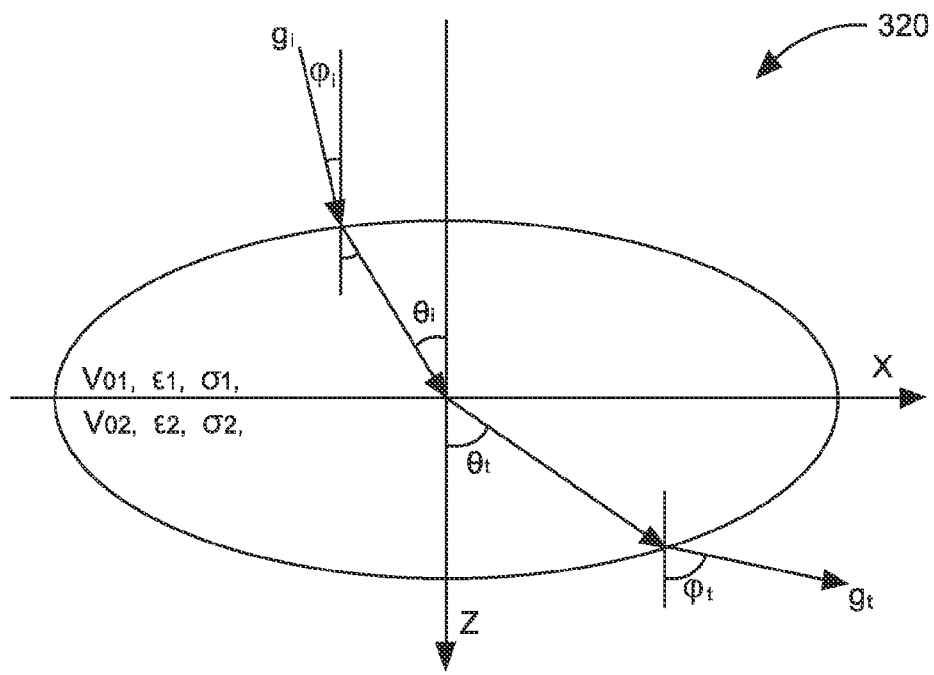

FIG. 3 illustrates the relationships between group angles ($\phi$) and phase angles ($\theta$) in isotropic media, according to various embodiments of the invention. To determine travel time in transverse isotropic media, one may consider that energy propagation (or the propagation of particle disturbance) is along the group vector at the group velocity while the wave-front travels along the phase vector at the phase velocity.

Graph 310 shows the relationship between the group vector and the phase vector in a homogeneous anisotropic medium. $V(\phi)$ is the group velocity and $V(\theta)$ is the phase velocity. $\phi$ is the incident group angle, and $\theta$ is the incident phase angle. In general, the velocities $V(\phi)$ and $V(\theta)$ are different. That is, the group angle ($\phi$) is different from the phase angle ($\theta$) except at two points: $\phi=\theta=$zero degrees, and at $\phi=\theta=$ninety degrees.

Graph 320 shows the group angles of incidence $\phi_i$ and transmission $\phi_t$ using the phase-slowness curve for two homogenous anisotropic media. $g_i$ is the group slowness vector in the incident medium and $g_t$ is the group slowness vector in the transmission medium. $\phi_i$ is the incident group angle, $\theta_i$ is the incident phase angle, $\phi_t$ is the transmitted group angle, and $\theta_t$ is the transmitted phase angle. $V_0$ is the velocity along the axis of symmetry, and $\epsilon$ (the epsilon ratio, or "epsilon") and $\delta$ (the delta ratio, or "delta") are anisotropic Thomsen parameters.

As is well known to those of ordinary skill in the art, delta $\delta$ and epsilon $\epsilon$ were invented by Leon Thomsen to be dimensionless/unit-less ratios used to describe seismic velocity anisotropy. The Thomsen epsilon ratio represents the fractional difference between the vertical and horizontal seismic P-wave velocities. For an epsilon ratio greater than zero, the horizontal P-wave velocity is higher than the vertical P-wave velocity. The Thomsen delta ratio determines the angular dependence of the horizontal P-wave velocity relative to the vertical P-wave velocity. If the delta ratio is greater than zero, the horizontal P-wave velocity increases away from the vertical P-wave velocity. If the delta ratio is smaller than zero, the horizontal P-wave velocity decreases away from the vertical P-wave velocity. Those that would like to learn more about Thomsen parameters and their derivation may refer to the article "Weak Elastic Anisotropy" by Thomsen, L., 1986. Geophysics, 51, pp. 1954-1966; as well as the article "Velocity Analysis for Transversely Isotropic Media" by Alkhalifah, T., et al., 1995, Geophysics, 60, pp. 1550-1566.

As part of implementing the methods 211 of FIG. 2, and considering the relationships shown in FIG. 3. Thomsen's parameters can be used to calculate layer phase velocity and group velocity. For example, seismic rays can be traced from a source point to a receiver location using the shooting method, which shoots a ray from a source to any given receiver, using different take-off group angles. These rays are traced along the group vector while phase angle and phase velocity are arranged to satisfy Snell's law across each layer interface (represented by the X axis in FIG. 3). Once the ray-paths are found, the travel-time is integrated along the path using the group velocity.

The exhaustive search 237 can be implemented as a grid search to scan a selected two-dimensional grid of $\delta$ and $\epsilon$ Thomsen parameters. At each point on the grid, an anisotropic model is built with the corresponding Thomsen parameters and a given velocity model 221 to simulate travel time data using a ray tracing algorithm, such as the aforementioned shooting method, or the two-point perturbation method, among others. An RMS error is computed at each grid point to represent the difference between the measured and modeled travel time at that point. The grid points with an RMS error that is below some selected threshold level comprise a search range over which the VFSA technique 245 is applied. The application of this technique will now be broken down and described with respect to five component elements.

First, the system configuration is considered. This involves forming the interval anisotropic parameter vector $X = (\delta_i, \ldots, \delta_N, \epsilon_i, \ldots, \epsilon_N)^T$, where N is the number of layers and $\delta_i$, $\epsilon_i$ are the Thomsen's parameters of $\delta$ and $\epsilon$ for layer i, respectively. The vector X represents the model that the VFSA technique will be used to perturb.

Second, an objective function for application of the VFSA technique is formed as equation (1):

$$E(X) = \sqrt{\frac{1}{R}\sum_{i=1}^{R}(t_i^{obs} - t_i^{cal})^2} \qquad (1)$$

where R is the total number of arrival time picks, $t_i^{obs}$ is the picked arrival time for arrival i, and $t_i^{cal}$ is the calculated arrival time for arrival i, given the velocity model defined by the vector X, the values of Thomsen's anisotropic parameters, the survey geometry, and the event origin times. The event origin time is the time that seismic shots are fired during field acquisition.

Third, the temperature cooling schedule $T_k$ is established in equation (2) as follows:

$$T_k = T_0 \exp(-ck^{1/(2N)}) \qquad (2)$$

where $T_0$ is the initial temperature, c is a parameter used to control the temperature schedule and help tune the algorithm for a specific problem, k is the iteration number in the optimization, and N is the total number of layers. For this application, a suitable value for c is approximately 0.5; a value of about 100 can be used for $T_0$.

Fourth, a uniformly distributed random variable u is generated to perturb the vector X. The interval anisotropy $x_i^k$ generated at annealing iteration k can then be updated as shown in equation (3):

$$x_i^{k+1} = x_i^k + q(x_i^{max} - x_i^{min}) \qquad (3)$$

where q is a random number that depends on u, and $x_i^{min}$; $x_i^{max}$ bound the interval anisotropy of layer i, which is constrained by $x_i \in [x_i^{min}, x_i^{max}]$. The random number q is generated as shown in formula (4), using the random variable u, which ranges between a value of zero and one ($u \in U[0,1]$):

$$q = \text{sgn}(u-0.5)T_k[(1+1/T_k)^{|2u-1|}-1] \qquad (4)$$

where sgn is the sign function. The random number q that results lies within a range of $-1$ and 1 ($q \in [-1,1]$) and guarantees convergence of the applied VFSA technique.

Fifth, and last, the iteration termination criteria for application of the objective function are established. These criteria are used to stop the annealing process, and may be arbitrarily selected, based on the available computing power and time. Reasonable constraints to be implemented might include a requirement that any remaining misfit is the same for a number of iterations at a temperature T that is arbitrarily close to zero, that the misfit is smaller than a selected threshold value, and/or that the total number of iterations executed has exceeded some selected maximum number of iterations. The process of applying the VFSA technique 245 can thus be halted when any one of these criteria is met, yielding the desired anisotropy parameters.

Those of ordinary skill in the art will realize, after reading this disclosure and the attached figures, that the methods 211 can be accomplished using analog, digital, and/or combinations of these types of electronics. Some examples of system embodiments that may include such circuitry will now be described.

Figure 4:
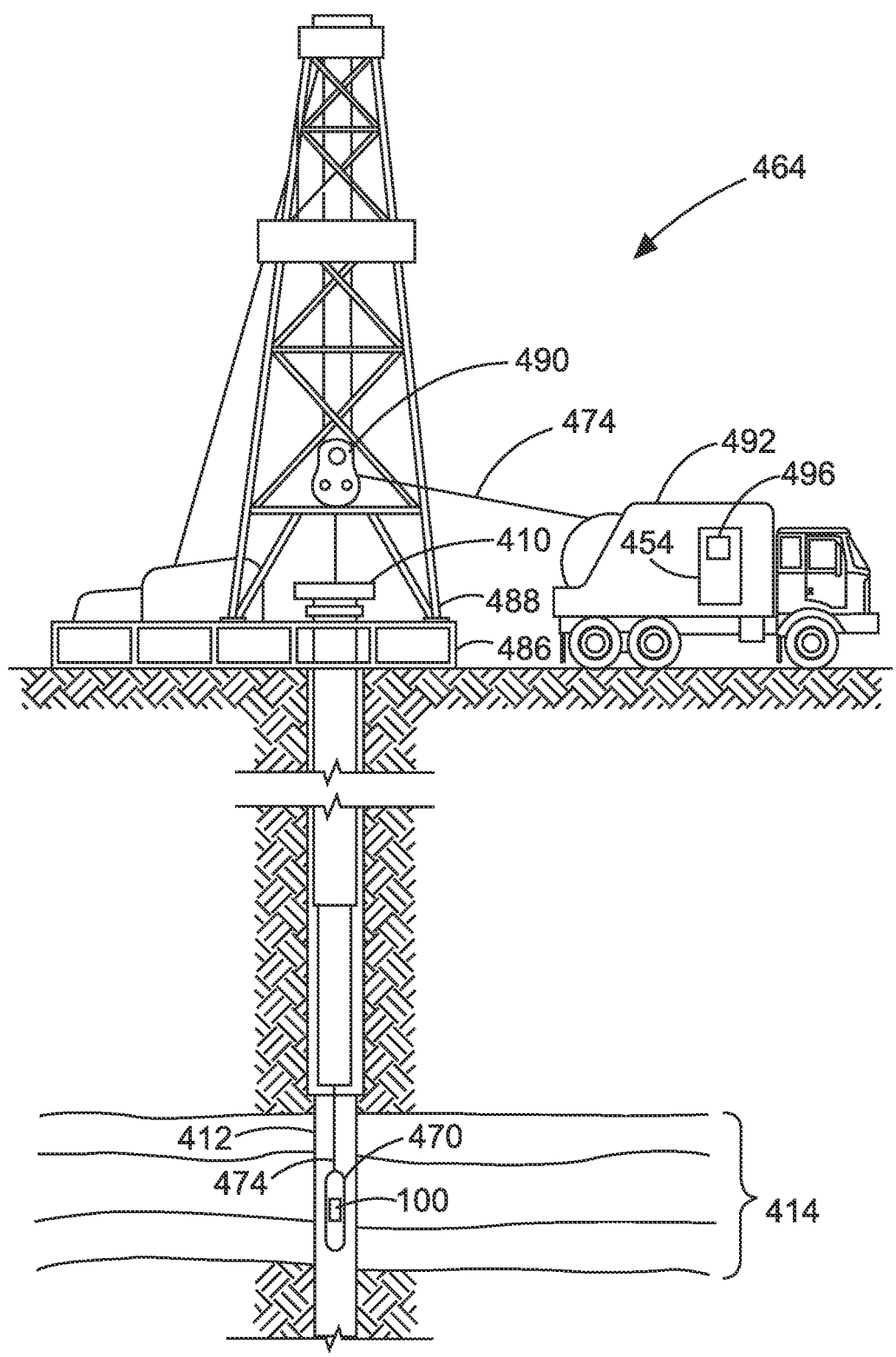
FIG. 4 illustrates a wireline system embodiment of the invention.
Figure 5:
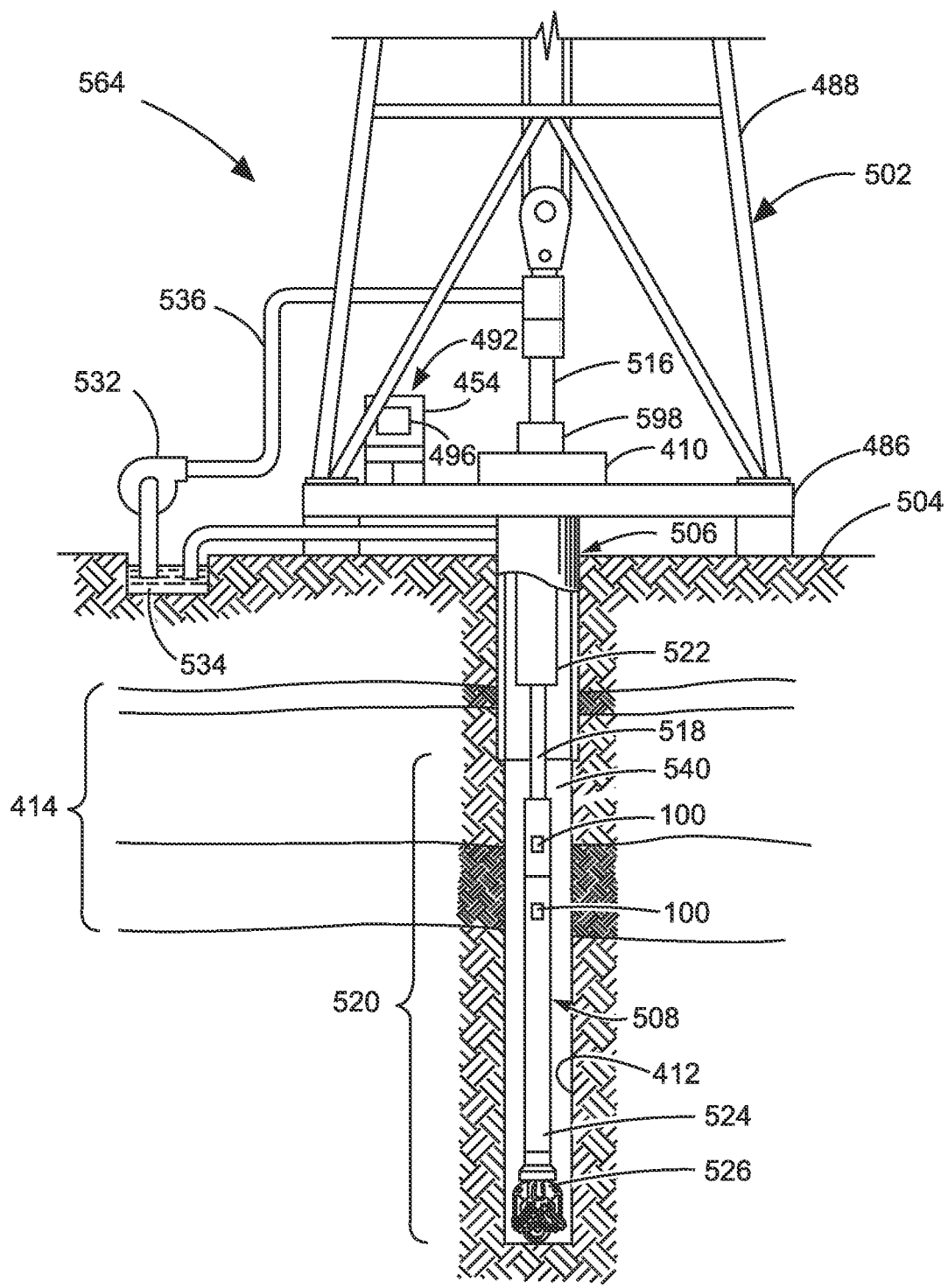
FIG. 5 illustrates a drilling rig system embodiment of the invention.

FIG. 4 illustrates a wireline system 464 embodiment of the invention, and FIG. 5 illustrates a drilling rig system 564 embodiment of the invention. Therefore, the systems 464, 564 may comprise portions of a wireline logging tool body 470 as part of a wireline logging operation, or of a down hole tool 524 as part of a down hole drilling operation.

Thus. FIG. 4 shows a well during wireline logging operations. In this case, a drilling platform 486 is equipped with a derrick 488 that supports a hoist 490.

Drilling oil and gas wells is commonly carried out using a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the wireline logging tool body 470 is lowered to the bottom of the region of interest and subsequently pulled upward at a substantially constant speed.

During the upward trip, at a series of depths various sensors and/or instruments (e.g., portions of the apparatus 100, or system 164 shown in FIG. 1) included in the tool body 470 may be used to perform measurements on the subsurface geological formations 414 adjacent the borehole 412 (and the tool body 470). The measurement data can be communicated to a surface logging facility 492 for processing, analysis, and/or storage. The logging facility 492 may be provided with electronic equipment for various types of signal processing, which may be implemented by any one or more of the components of the apparatus 100 or system 164 in FIG. 1. Similar formation evaluation data may be gathered and analyzed during drilling operations (e.g., during logging while drilling (LWD) operations, and by extension, sampling while drilling).

In some embodiments, the tool body 470 is suspended in the wellbore 412 by a wireline cable 474 that connects the tool to a surface control unit (e.g., comprising a workstation 454). The tool may be deployed in the borehole 412 on coiled tubing, jointed drill pipe, hard wired drill pipe, or any other suitable deployment technique.

Turning now to FIG. 5, it can be seen how a system 564 may also form a portion of a drilling rig 502 located at the surface 504 of a well 506. The drilling rig 502 may provide support for a drill string 508. The drill string 508 may operate to penetrate the rotary table 410 for drilling the borehole 412 through the subsurface formations 414. The drill string 508 may include a Kelly 516, drill pipe 518, and a bottom hole assembly 520, perhaps located at the lower portion of the drill pipe 518.

The bottom hole assembly 520 may include drill collars 522, a down hole tool 524, and a drill bit 526. The drill bit 526 may operate to create the borehole 412 by penetrating the surface 504 and the subsurface formations 414. The down hole tool 524 may comprise any of a number of different types of tools including measurement while drilling (MWD) tools, LWD tools, and others.

During drilling operations, the drill string 508 (perhaps including the Kelly 516, the drill pipe 518, and the bottom hole assembly 520) may be rotated by the rotary table 410. Although not shown, in addition to, or alternatively, the bottom hole assembly 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation cuttings created by operating the drill bit 526.

Thus, referring now to FIGS. 1 and 3-5, it may be seen that in some embodiments, the systems 464, 564 may include a drill collar 522, a down hole tool 524, and/or a wireline logging tool body 470 to house one or more apparatus 100, similar to or identical to the apparatus 100 described above and illustrated in FIG. 1. Components of the system 164 in FIG. 1 may also be housed by the tool 524 or the tool body 470.

Thus, for the purposes of this document, the term "housing" may include any one or more of a drill collar 522, a down hole tool 524, or a wireline logging tool body 470 (all having an outer surface, to enclose or attach to magnetometers, sensors, fluid sampling devices, pressure measurement devices, temperature measurement devices, transmitters, receivers, acquisition and processing logic, and data acquisition systems). The tool 524 may comprise a down hole tool, such as an LWD tool or MWD tool. The wireline tool body 470 may comprise a wireline logging tool, including a probe or sonde, for example, coupled to a logging cable 474. Many embodiments may thus be realized.

For example, in some embodiments, a system 164, 464, 564 may include a display 496 to present formation VSP survey information, both measured and processed/calculated, as well as database information, perhaps in graphic form. A system 164, 464, 564 may also include computation logic, perhaps as part of a surface logging facility 154, 492, or a computer workstation 454, to receive signals from transmitters and to send signals to receivers, and other instrumentation to determine properties of the formation 114, 414.

In some embodiments, a system 164, 464, 564 includes a housing 104, one or more sensors S to acquire seismic survey data, such as VSP survey data, and one or more processor(s) 130 to provide an anisotropic model of the formation 114, 414 based on the acquired seismic survey data. Such systems 164, 464, 564 may operate, using at least one down hole sensor attached to the housing, to acquire seismic survey data describing a selected geological formation volume, and subsequently, to process the seismic survey data (e.g., walk-away VSP data).

Thus, in most embodiments, the systems 164, 464, 564 include a processor 130 to receive and exhaustively search the seismic survey data to provide an error map. The processor 130 can be configured to globally optimize the error map to provide anisotropy parameters for the selected geological formation volume, and to invert the anisotropy parameters to transform an isotropic velocity model describing the selected geological formation volume into an anisotropic velocity model M for the selected geological formation volume. The processor 130 can be located down hole, perhaps contained within the housing 104, or at the surface 166, 504.

A plurality of sensor types can be used to acquire the seismic survey data. Thus, one or more of the sensors S attached to the housing 104 in the system 164, 464, 564 may comprise acoustic sensors, inductive sensors, etc.

In some embodiments, a transmitter is used to send acquired data to the surface for processing. Thus, systems 164, 464, 564 may include a telemetry transmitter (e.g., as part of the transceiver 144) to communicate the data 170, such as seismic survey data, from the housing 104 to a surface workstation 454.

As noted previously, Thomsen parameters are dimensionless combinations of elastic moduli which can be used to characterize transversely isotropic materials, including geological formations. These parameters, including epsilon, delta, and gamma can be defined in terms of elastic stiffness matrix components, as is well known to those of ordinary skill in the art. When associated with P wave and S wave velocities, these parameters can be used to characterize wave propagation through weakly anisotropic, layered media, such as rock formations. Thus, these parameters may be used in a number of ways, in conjunction with the anisotropic velocity model M provided by various methods described herein, to determine formation characteristics, revise formation images, and guide drilling efforts, for example.

In some embodiments, a processor is used to search Thomsen's parameters arranged in a grid, to produce an error map. Thus, the system 164, 464, 564 may include a processor that is configured to exhaustively search a two-dimensional grid of Thomsen parameters comprising epsilon and delta to provide the error map. Many other embodiments may be realized.

The apparatus 100; housing 104; model 110; formations 114, 414; image 118; data acquisition system 124; processors 130; database 134; logic 140; transceiver 144; memory 150; surface logging facilities 154, 492; systems 164, 464, 564; surfaces 166, 504; data 170, rotary table 410; borehole 412; workstation 454; wireline logging tool body 470; logging cable 474; drilling platform 486; derrick 488; hoist 490; logging facility 492; display 496; drill string 508; Kelly 516; drill pipe 518; bottom hole assembly 520; drill collars 522; down hole tool 524; drill bit 526, mud pump 532; mud pit 534; hose 536; model M; and sensors S may all be characterized as "modules" herein.

Such modules may include hardware circuitry, and/or a processor and/or memory circuits, software program modules and objects, and/or firmware, and combinations thereof, as desired by the architect of the apparatus 100 and systems 164, 464, 564 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a formation velocity model simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 100 and systems 164, 464, 564 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 6:
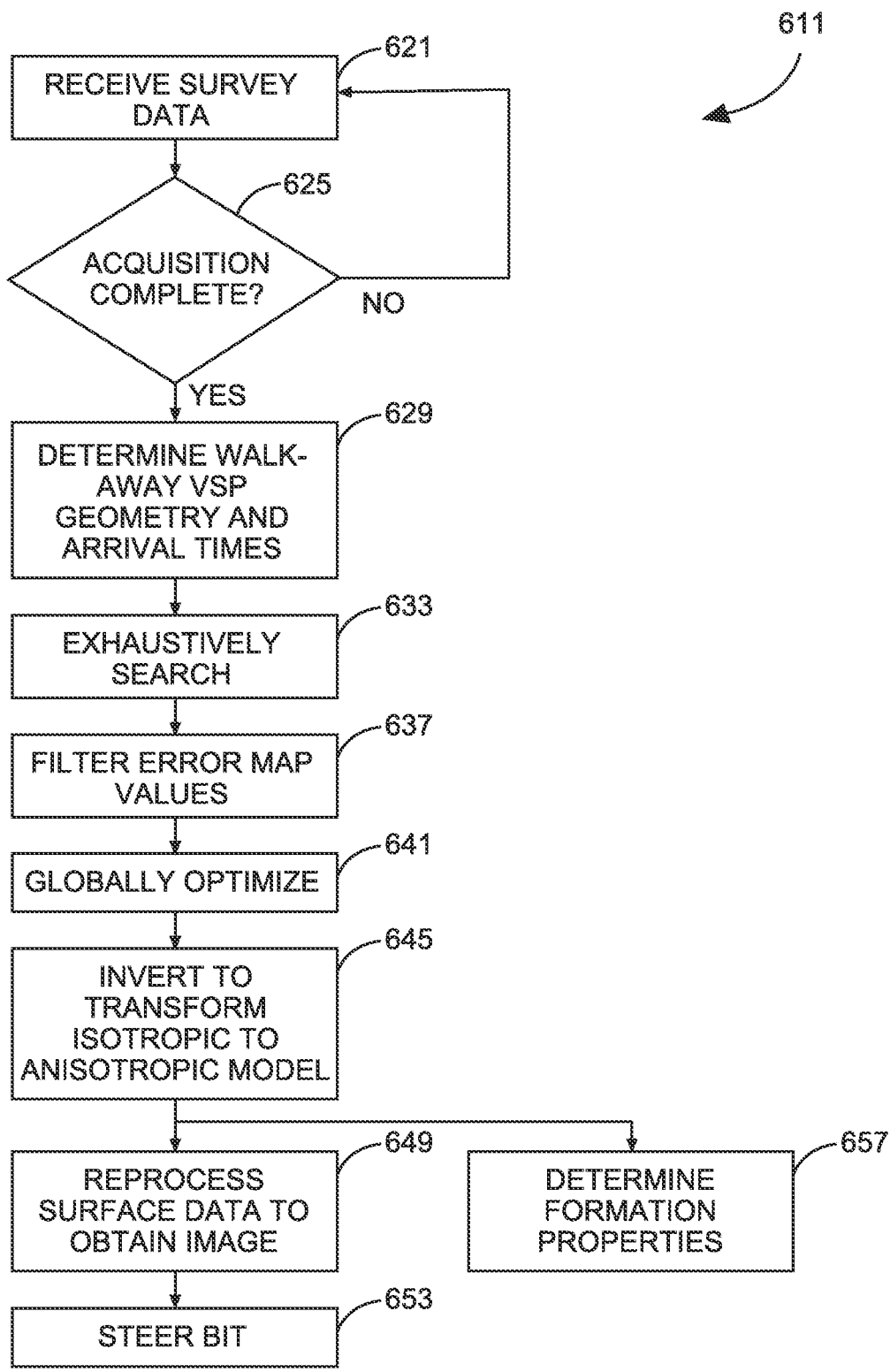
FIG. 6 is a flow chart illustrating several additional methods according to various embodiments of the invention.

For example, FIG. 6 is a flow chart illustrating several additional methods 611 according to various embodiments of the invention. In one embodiment, a method 611 may comprise acquiring seismic survey data at block 621, exhaustively searching the acquired data to produce an error map at block 633, globally optimizing the map to produce a set of anisotropy parameters (e.g., Thomsen's parameters) at 641, and inverting the set of parameters to transform an isotropic model into an anisotropic model at block 645.

Thus, a processor-implemented method 611, to execute on one or more processors that perform the method, may begin at block 621 with receiving seismic survey data for use with an isotropic velocity model describing a selected geological formation volume.

The seismic survey data may comprise various types of data. Thus, the seismic survey data may comprise walk-away seismic survey data or three-dimensional seismic survey data, among others.

If data acquisition is complete, as determined at block 625, then the method 611 may continue on to block 629. Otherwise, the method 611 may return to block 621, to acquire additional seismic survey data.

In some embodiments, the seismic survey data can be used to determine walk-away VSP survey geometry, which can in turn be used to determine arrival times in the formation. Thus, the method 611 may include, at block 629, determining walk-away VSP survey geometry from the seismic survey data, and determining direct arrival times from the walk-away VSP survey geometry.

In some embodiments, arrival times in the formation are computed using ray tracing with layer phase and group velocities. Thus, the activity of determining direct arrival times at block 629 may comprise calculating the direct arrival times by computing layer phase velocity and group velocity in the geological formation volume using ray tracing.

The method 611 may continue on to block 633 with exhaustively searching the seismic survey data to provide an error map. The error map values can be determined using a selected isotropic velocity model and Thomsen's parameters (which may be used to bound the searching range).

The Thomsen's parameters can be obtained from the seismic survey data. Thus, the activity at block 633 may comprise using an isotropic velocity model and Thomsen's parameters to determine values in the error map, the isotropic velocity model obtained from the seismic survey data comprising a zero-offset VSP survey.

Exhaustively searching may comprise many activities, including scanning a grid of data associated with Thomsen parameters, building models for each grid point, and determining the misfit error at each point. The grid points may be confined to include only values of delta and epsilon. Thus, the activity at block 633 may include scanning a two-dimensional grid having parameter grid points associated with selected Thomsen parameters; and, for each of the parameter grid points, building an anisotropic model with the associated Thomsen parameters and an isotropic velocity model obtained from the seismic survey data comprising a vertical seismic profile survey, to simulate travel times within the geological formation volume. Further activity may include producing the error map as a set of error grid points corresponding to the parameter grid points and representing error as a difference between measured and modeled travel time within the selected geological formation volume.

The error map values can be filtered, using a selectable threshold, to remove larger error values. Thus, the method 611 may continue on to block 637 to include filtering values in the error map to remove grid points having an error above a selected threshold, to provide remaining grid points as input for globally optimizing the error map.

The method 611 may continue on to block 641 to include globally optimizing the error map to provide anisotropy parameters for the selected geological formation volume. A VFSA technique can be used to implement global optimization. Thus, the activity at block 641 may include determining the anisotropy parameters using the VFSA technique. The VFSA technique may be applied to selected ones of the error grid points in the error map, with an objective function defined by travel time differences in the geological formation volume, and a temperature cooling schedule defined by the number of layers in the geological formation volume.

The VFSA technique may include perturbing an interval anisotropic parameter vector that represents a model of the formation. Thus, the activity at block 641 may comprise perturbing a model of the geological formation volume represented by an interval anisotropic parameter vector with a random variable that has a selected probability distribution to guarantee convergence.

The method 611 may continue on to block 645 to include inverting the anisotropy parameters to transform the isotropic velocity model into an anisotropic velocity model for the selected geological formation volume.

Once the anisotropic velocity model is obtained, it can be used to assist in many tasks, such as reprocessing surface seismic data to produce improved images of the formation. Thus, the method 611 may continue on to block 649 to include reprocessing surface seismic data by using the anisotropic velocity model and associated values of the anisotropy parameters as Thomsen's parameters (e.g., comprising delta and epsilon) to provide a new image of the selected geological formation volume.

The anisotropic velocity model can be used to guide drilling operations. Thus, the method 611 may continue on to block 653 to include steering a drill bit during drilling operations using the anisotropic velocity model and the new image.

The anisotropic velocity model can also be used to determine formation properties, such as characterizing formation fractures. Thus, the method 611 may include, at block 657, determining formation properties using the anisotropic velocity model and estimated fracture parameters, among others.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 2 and 6) can be substituted, one for another, within and between methods.

Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 7:
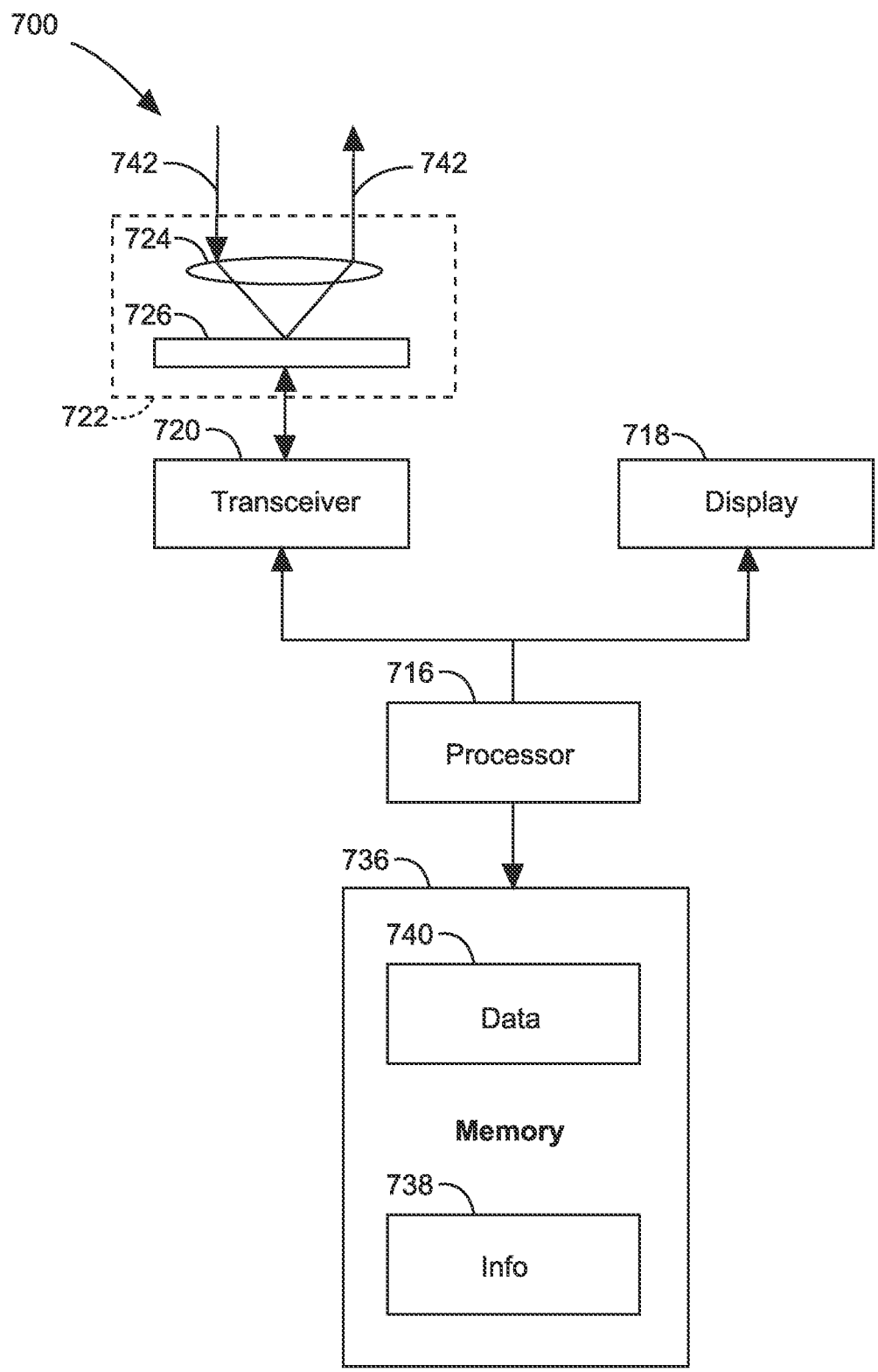
FIG. 7 is a block diagram of an article according to various embodiments of the invention.

For example, FIG. 7 is a block diagram of an article 700 of manufacture according to various embodiments, such as a computer, a memory system, a magnetic or optical disk, or some other storage device. The article 700 may include one or more processors 716 coupled to a machine-accessible medium such as a memory 736 (e.g., removable storage media, as well as any tangible, non-transitory memory including an electrical, optical, or electromagnetic conductor) having associated information 738 (e.g., computer program instructions and/or data), which when executed by one or more of the processors 716, results in a machine (e.g., the article 700) performing any actions described with respect to the methods of FIGS. 2 and 6, the apparatus of FIG. 1, and the systems of FIGS. 1, 4, and 5. The processors 716 may comprise one or more processors sold by Intel Corporation (e.g., Intel, Core™ processor family), Advanced Micro Devices (e.g., AMD Athlon™ processors), and other semiconductor manufacturers.

In some embodiments, the article 700 may comprise one or more processors 716 coupled to a display 718 to display data processed by the processor 716 and/or a wireless transceiver 720 (e.g., a down hole telemetry transceiver) to receive and transmit data processed by the processor.

The memory system(s) included in the article 700 may include memory 736 comprising volatile memory (e.g., dynamic random access memory) and/or non-volatile memory. The memory 736 may be used to store data 740 processed by the processor 716.

In various embodiments, the article 700 may comprise communication apparatus 722, which may in turn include amplifiers 726 (e.g., preamplifiers or power amplifiers) and one or more antenna 724 (e.g., transmitting antennas and/or receiving antennas). Signals 742 received or transmitted by the communication apparatus 722 may be processed according to the methods described herein.

Many variations of the article 700 are possible. For example, in various embodiments, the article 700 may comprise a down hole tool, including the apparatus 100 shown in FIG. 1. In some embodiments, the article 700 is similar to or identical to the apparatus 100 or system 164 shown in FIG. 1.

In summary, the apparatus, systems, and methods disclosed herein can be used to address the difficult problem of determining anisotropic parameters from surface seismic data, even when relatively poor data quality is present. A double-searching schedule that comprises an exhaustive search followed by a global optimization method can be used to determine global extreme values. This efficient solution may significantly enhance the value of the services provided by an operation/exploration company, perhaps enabling the determination of rock properties directly from VSP data in a commercially practical manner.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:
1. A system, comprising:
 a housing;
 at least one down hole sensor attached to the housing, the at least one down hole sensor to provide seismic survey data describing a selected geological formation volume; and
 at least one processor to receive and exhaustively search the seismic survey data to provide an error map, to globally optimize the error map to provide anisotropy parameters for the selected geological formation volume, and to invert the anisotropy parameters to transform an isotropic velocity model describing the selected geological formation volume into an anisotropic velocity model for the selected geological formation volume.

2. The system of claim 1, wherein the at least one processor is contained within the housing.

3. The system of claim 1, wherein the at least one down hole sensor comprises a plurality of acoustic sensors.

4. The system of claim 1, further comprising:
a telemetry transmitter to communicate the seismic survey data from the housing to a surface workstation.

5. The system of claim 1, wherein the housing comprises one of a wireline tool or a measurement while drilling tool.

6. The system of claim 1, wherein the at least one processor is configured to exhaustively search a two-dimensional grid of Thomsen parameters comprising epsilon and delta to provide the error map.

7. A processor-implemented method, to execute on one or more processors that perform the method, comprising:
receiving seismic survey data for use with an isotropic velocity model describing a selected geological formation volume;
exhaustively searching the seismic survey data to provide an error map;
globally optimizing the error map to provide anisotropy parameters for the selected geological formation volume; and
inverting the anisotropy parameters to transform the isotropic velocity model into an anisotropic velocity model for the selected geological formation volume.

8. The method of claim 7, wherein the seismic survey data comprises one of walk-away seismic survey data or three-dimensional seismic survey data.

9. The method of claim 7, further comprising:
determining walk-away vertical seismic profile (VSP) survey geometry from the seismic survey data; and
determining direct arrival times from the walk-away VSP survey geometry.

10. The method of claim 9, wherein determining the direct arrival times comprises:
calculating the direct arrival times by computing layer phase velocity and group velocity in the geological formation volume using ray tracing.

11. The method of claim 7, wherein exhaustively searching comprises:
using an isotropic velocity model and Thomsen's parameters to determine values in the error map, the isotropic velocity model obtained from the seismic survey data comprising a zero-offset vertical seismic profile (VSP) survey.

12. The method of claim 7, further comprising:
filtering values in the error map to remove grid points having an error above a selected threshold, to provide remaining grid points as input for globally optimizing the error map.

13. The method of claim 7, wherein globally optimizing further comprises:
determining the anisotropy parameters using a very fast simulated annealing technique.

14. The method of claim 13, wherein the very fast simulated annealing technique comprises:
perturbing a model of the geological formation volume represented by an interval anisotropic parameter vector with a random variable that has a selected probability distribution to guarantee convergence.

15. The method of claim 7, further comprising:
reprocessing surface seismic data, using the anisotropic velocity model and associated values of the anisotropy parameters as Thomsen's parameters comprising delta and epsilon to provide a new image of the selected geological formation volume.

16. The method of claim 15, further comprising:
steering a drill bit during a drilling operation using the anisotropic velocity model and the new image.

17. The method of claim 7, further comprising:
determining formation properties using the anisotropic velocity model and estimated fracture parameters.

18. An article including a machine-accessible medium having instructions stored therein, wherein the instructions, when accessed, result in a machine performing:
receiving seismic survey data for use with an isotropic velocity model describing a selected geological formation volume;
exhaustively searching the seismic survey data to provide an error map;
globally optimizing the error map to provide anisotropy parameters for the selected geological formation volume; and
inverting the anisotropy parameters to transform the isotropic velocity model into an anisotropic velocity model for the selected geological formation volume.

19. The article of claim 18, wherein the instructions, when accessed, result in the machine exhaustively searching by:
scanning a two-dimensional grid having parameter grid points associated with Thomsen parameters;
for each of the parameter grid points, building an anisotropic model with the associated Thomsen parameters and an isotropic velocity model obtained from the seismic survey data comprising a vertical seismic profile survey, to simulate travel times within the geological formation volume; and
producing the error map as a set of error grid points corresponding to the parameter grid points and representing error as a difference between measured and modeled travel time within the geological formation volume.

20. The article of claim 19, wherein the instructions, when accessed, result in the machine globally optimizing by:
applying a very fast simulated annealing technique to selected ones of the error grid points in the error map, with an objective function defined by travel time difference in the geological formation volume and a temperature cooling schedule defined by a number of layers in the geological formation volume.

* * * * *